United States Patent Office 2,816,934
Patented Dec. 17, 1957

2,816,934

NUCLEAR DISUBSTITUTED ISOPROPENYL BENZENES

Guido H. Stempel, Jr., Akron, Ohio, assignor to The General Tire and Rubber Company, Akron, Ohio, a corporation of Ohio No Drawing. Application February 21, 1950,
Serial No. 145,590

8 Claims. (Cl. 260—650)

This application is a continuation-in-part of my prior application Serial No. 778,747, filed October 9, 1947, now abandoned, which was copending both with my earlier application Serial No. 708,195, filed November 6, 1946, now abandoned, and with application Serial No. 668,474, filed May 9, 1946, jointly with Dr. G. B. Bachman, U. S. Patent No. 2,522,981. This application is a continuation-in-part of application Serial No. 22,656 to G. H. Stempel, Jr. and G. H. Swart, filed April 22, 1948, now abandoned, and assigned to the same assignee as the subject application.

The invention relates to certain disubstituted isopropenylbenzenes which have outstanding properties and to a method of preparing such isopropenylbenzenes.

Inasmuch as the present invention is concerned only with disubstituted isopropenylbenzenes which copolymerize with butadiene and other conjugated diolefinic compounds, it is thought that the present invention is clarified by first considering certain of the properties of dichlorostyrene, properties of alpha-methylstyrene and the properties of the thirty next higher monologues of dichlorostyrene. This will emphasize the fact that 3,4-disubstituted isopropenyl benzenes and the 3,5-disubstituted isopropenylbenzenes are unique among the thirty odd isomers in that they copolymerize with conjugated diolefinic compounds and have no noticeable tendency for homopolymerization by free radical mechanisms.

It is known that dichlorostyrenes such as the 1-vinyl-2,4-dichlorobenzene and the 1-vinyl-2,5-dichlorobenzene, and others, may be polymerized and copolymerized to produce rubbers or resins having especially desirable properties. Thus, the rubbery copolymer of one or more butadiene compounds and a mixture of the isomers of dichlorostyrene has properties in several respects superior to those of natural rubber for tire treads and the like.

There are, for example, at least six isomeric dichlorostyrenes having the same empirical formula and having both chlorine atoms on the benzene ring. All six of these isomeric dichlorostyrenes homopolymerize, i. e., polymerize with themselves, with extreme rapidity. In fact, they are so extremely active compared to styrene that great difficulty is experienced in handling and preparing them. A substantial amount of inhibitor must be present during their preparation and storage and they should be stored at relatively low temperature at all times prior to use. The result of this extreme activity toward polymerization renders their preparation and the preparation of copolymerization products relatively more expensive than would otherwise be the case.

Alpha-methylstyrene on the other hand forms copolymers with many or most monomers but unlike styrene and any of the dichlorostyrenes it has little tendency for homopolymerization.

Each of the six isomeric dichlorostyrenes has at least five next higher homologues, each of which has the same empirical formula which differs from that of dichlorostyrene only in that it has a —$CH_3$ group in place of a hydrogen of the dichlorostyrene. It is recognized that there was a period in chemical history when it was considered that a single member of a homologous series indicated the properties of the higher members of the series. While such may be true of the simplest aliphatic compounds, it is now recognized that in more complex molecules the properties of a lower homologue not only do not necessarily indicate the properties of all next higher homologues but may actually indicate false and misleading properties. The error of drawing conclusions based on the properties of the lower homologue is here illustrated particularly as to homopolymerization and as to copolymerization with diolefines.

While most of these thirty isomeric next higher homologues of dichlorostyrene also have properties similar to the basic dichlorostyrenes, two homologues of each, namely, those having methyl groups in the alpha or beta position, are not only not highly reactive toward homopolymerization as are the basic dichlorostyrenes but have no appreciable or noticeable tendency to homopolymerize by free radical mechanisms. Furthermore, 10 of these 12 next higher homologues of dichlorostyrene are apparently inert to copolymerization with diolefines by free radical mechanisms.

It was the stated opinion of others, who, prior to the present invention, had investigated homopolymerization and copolymerization with diolefines of dichloro-alpha-methylstyrenes prepared by a process analogous to that used commercially for preparing dichlorostyrenes, that all 12 of these structurally closely related materials were inert to copolymerization with diolefines such as butadiene 1,3-chloroprene, etc.

Most of the dichloro-alpha-methylstyrenes also have properties unlike those of alpha-methylstyrene itself. Alpha-methylstyrene, as is well known, copolymerizes with various materials including styrene and many other mono-olefines to produce desirable polymerization products. The inert behavior of the dichloro-alpha-methylstyrenes prepared and tested for copolymerization with diolefines prior to the present invention indicated that all of the dichloro-alpha-methylstyrenes also differed radically as to copolymerizability not only from dichlorostyrene but from alpha-methylstyrene as well.

An object of the present invention is to obtain monomeric materials having one or more of the advantages of the dichlorostyrenes but which are free from the disadvantages which make this material so expensive to prepare and so difficult to use.

I have found that the alpha-methylstyrenes, which are further characterized by having two substituents, all of which are in the nucleus and none of which are attached directly to carbon atoms next adjacent that carrying the isopropenyl group surprisingly fulfill the above objects providing the two substituents are further characterized in that they are selected from the ortho-para-directing groups halogen (including fluorine, chlorine and bromine) and alkyl (preferably methyl) groups. All other ortho-para-directing groups of which I am aware, namely, —OH, —OR and —$NR_2$, where R is hydrogen, alkyl and etc. highly activate the benzene ring and are here undesirable.

These alpha-methylstyrenes include the 3,4-dichloro-alpha-methylstyrene, the 3,5-dichloro-alpha-methylstyrene, the 4-chloro-3-methyl-alpha-methylstyrene, the 3-chloro-4-methyl-alpha-methylstyrene and also the 3,4- and the 3,5-dimethyl-alpha-methylstyrene. All of these materials when reasonably pure i. e. when free from more than 20 percent of nonpolymerizable ingredients such as an alpha-methylstyrene substituted in ortho positions and the like, readily form rubbery copolymers with butadiene having desirable properties; whereas, when the alpha-methylstyrene contains an ortho-para directing group in an ortho position to the carbon atom carrying the isopropenyl group, I have been unable to form copolymers by free radical mechanisms with butadiene and the like. Such ortho substituted alpha-methylstyrenes are apparently inert to copolymerization with butadiene and the like by free radical mechanisms. They are also substantially inert to free radical homopolymerization.

This inertness in character of ortho substituted material was at first explained by the fact that the combination of the alpha-methyl and ortho substituents so sterically hindered the molecule that the coplaner arrangement necessary for resonance could not occur. The alpha-methyl group alone was thought by steric hindrance to prevent similar molecules from getting close enough together to unite. It has been more recently found however, that 3,5-dichloro-alpha-methylstyrene does in fact form a copolymer with 3,4-dichloro-alpha-methylstyrene. It therefore appears that steric considerations may not be the entire explanation for the strange behavior of these 3,4- and 3,5-disubstituted alpha-methylstyrenes and account for the marked difference between the properties of these materials and in the properties of their next lower homologues, 3,4- and 3,5-dichlorostyrenes, for example, which homopolymerize with marked avidity.

While both of the nuclear substituents may be methyl groups and it is found that these materials give copolymers with diolefines etc. having some exceptional properties, superior properties are imparted to copolymers when at least one halogen atom is attached to the 3- or 4-position of the nucleus and the other substituents are selected from methyl and halogen groups. Much superior properties are imparted to copolymers with diolefines and the like when both of the substituents are halogen such as chlorine.

The 3,4- and 3,5-dichloro-alpha-methylstyrene yield, as is set forth in the application of T. A. Te Grotenhuis and G. H. Swart Serial No. 145,902, filed February 23, 1950, now U. S. Patent No. 2,645,632, and assigned to the assignee hereof, copolymers having exceptional properties such as heat distortion combined with high resistance to crazing when contacted with hydrocarbon solvents, waxes and the like. This resistance to crazing is apparently reduced or eliminated by the presence of large halogen atoms such as chlorine, bromine and the like which may effectively insulate the molecule. The resistance to crazing is, of course, reduced by the substitution of even one halogen atom by a methyl group and is not appreciably greater than that of polystyrene when both of the substituents are methyl.

The 3,4-disubstituted isopropenylbenzenes (3,4-dissubstituted-alpha-methylstyrenes) having at least one nuclear halogen are especially important monomeric materials in that they may be prepared in a more direct and economic manner than may the 3,5-disubstituted isopropenylbenzenes and in that, as set forth in the above noted copending application of T. A. Te Grotenhuis and Gilbert H. Swart above noted, they form copolymers having surprisingly desirable properties with certain mono-olefines. Substantially all of these disubstituted isopropenylbenzenes including the 3,4-dichloro-alpha-methylstyrenes, the 3-chloro-4-methyl-alpha-methylstyrene and the 4-chloro-3-methyl-alpha-methylstyrene may be prepared by dehydrogenating the corresponding substituted cumene which in turn may be prepared from readily available materials. Thus, the 3-chloro-4-methyl-alpha-methylstyrene and the 4-chloro-3-methyl-alpha-methylstyrene may be prepared from the corresponding para and meta cymenes by nuclear monochlorination and subsequent dehydrogenation of the resultant purified product. The 3,4-dichloro-alpha-methylstyrene may be prepared by isopropylating orthodichlorobenzene and dehydrogenating the resultant product. It is not obtained, at least in appreciable percentages, by the process analogous to the commercially used preparation of dichlorostyrene in which process the ethylene is substituted by propylene and isopropylbenzene is halogenated in the nucleus and in the side chain and the resultant material thereafter dehydrohalogenated in the side chain. The products thus produced have halogen in the positions ortho to the isopropenyl group and are inert to free radical copolymerization processes and are undesirable.

3,4-dimethyl-alpha-methylstyrene may be prepared by suitable methylating para-cymene in the nucleus and dehydrogenating the resultant product. The 3,5-disubstituted isopropenylbenzenes in which the substituents are both methyl or halogen are somewhat more difficult to prepare than the 3,4-disubstituted materials but is found that they also provide advantages obtained with dichlorostyrenes without all of the disadvantages of the monomer.

In order to obtain benefits from the disubstituted alpha-methylstyrenes of the present invention they should be free from substantial amounts of impurities particularly isoalkylenylbenzenes having chlorine or substituents on the 2- and 6-positions of the nucleus. Such materials act as diluents and are difficult to remove. Moreover they tend to mask the desirable characteristics of the 3,4- and 3,5-disubstituted alpha-methylstyrenes of the present invention. More than 20 or 30 percent (based on the weight of the total 3,4- and 3,5-disubstituted-alpha-methylstyrenes of the present invention) of unpolymerizable diluents, particularly when these diluents have a boiling point within 10° C. at atmospheric pressure or when they contain isopropenylbenzenes having substituents on the nuclear carbon atoms ortho to the isopropenyl group, generally substantially mask the desirable properties of the copolymerizable disubstituted-alpha-methylstyrenes. Generally the total amount of unpolymerizable high boiling material should not exceed 15 or 20 percent for a commercially useable product.

3,4-dichloro-isopropenylbenzene is preferably prepared by reacting ortho-dichlorobenzene with propylene in the presence of a relatively small amount, usually about 0.1 or 0.2 of a molecular weight, of anhydrous aluminum chloride at temperatures ranging from about 20° C. to about 100° C. The dichlorobenzenes should for best results always be present in molar excess and a molar ratio of dichlorobenzene to propylene of about 3 to 10 is preferred. The molar ratio of aluminum chloride to dichlorobenzene is preferably about 0.1 to 1. The propylene may be bubbled through isopropyl chloride at room temperature to introduce a small amount of isopropyl chloride into the reaction mixture and thus facilitate the reaction. Isopropyl chloride may also be used as the sole propylating agent as it reacts readily with o-dichlorobenzene in the presence of anhydrous aluminum chloride. If no isopropyl chloride is used a small amount of dry hydrogen chloride is preferably incorporated with the propylene. When the reaction is complete the resulting product is preferably washed with a strong alkali such as a 50 percent sodium hydroxide solution and distilled. The fraction boiling between 230–236° C. contains the desired 3,4-dichlorocumene and is retained for dehydrogenation to form the isopropenylbenzenes. The higher boiling di- and tri-isopropenyldichlorobenzenes can be used as a source of isopropenyl groups in subsequent alkylations if desired.

The 3,4-dichlorocumene is generally dehydrogenated by passing it with a diluent, preferably super-heated steam in which the steam dichlorocumene ratio is from about 5 to about 15 through a zone at high temperatures (preferably 540° C. to 625° C.) in contact with any suitable dehydrogenation catalyst. Generally the dehydrogenation, like the alkylations is accomplished in continuous manner by passing the dichlorocumene through a tube containing pellets of a dehydrogenation catalyst.

The product usually contains about 25 to 45 percent of 3,4-dichloro-alpha-methylstyrene. The remainder, except for minor impurities, is undehydrogenated 3,4-dichlorocumene. The product may be separated into its components by fractionation at 50 mm. pressure and the dichlorocumene recycled. The impurities are usually very small percentages of low boiling material, dichlorostyrene, and high boiling material or tar.

The material from which the tube is constructed is not critical, copper, quartz, vycor glass and other materials being suitable. Usual dehydrogenation catalysts may be used for dehydrogenating 3,4-dichloroisopropylbenzene, 3 - chloro - 4 - methylisopropylbenzene and 4-methyl-3-chloroisopropylbenzene to give the corresponding isopropenylbenzene. The conditions of temperature, contact time and etc., as is well known in the art, differ from maximum dehydrogenation efficiency with the different catalysts and pellet or grain sizes of the same catalysts. The contact times are usually, however, within the range of 0.4 second to 2.0 seconds for greatest efficiency.

The following examples illustrate the preparation of monomeric materials of the present invention:

Example 1

Ortho-dichlorobenzene is mixed with propylene in the proportion such that the molar ratio of dichlorobenzene to propylene is about from 3 to 10. The mixture is then passed trough a reaction zone containing aluminum chloride in an amount such that the molar ratio of aluminum chloride to dichlorobenzene present in the reaction chamber is always about 0.1 to 1. The reaction product is distilled to obtain 3,4-dichlorocumene. The yield of 3,4-dichlorocumene is about 58 percent.

Example 2

1184 grams of 3,4-dichlorocumene prepared as in Example 1 were passed at atmospheric pressure and in admixture with superheated steam, into a bed of dehydrogenation catalysts maintained at a temperature 540° to 625° C. The steam and dichlorocumene were introduced into the catalyst bed at the respective rates of about 3.03 grams and 6.84 grams per minute which corresponds to 12.19 liters of steam and 2.63 liters of dichlorocumene per minute. The contact time was 1.5 seconds and the specific space velocity was .059 grams per gram with catalysts per hour. The product from the reaction zone was condensed to yield 1137 grams of liquid. The total liquid loss was about 4 percent and the total loss of materials during the dehydrogenation was about 6.1 percent. The 3,4-dichloro-alpha methylstyrene was separated from the product by fractional distillation at 50 mm. pressure in an amount such that the yield was 33.5 percent of the weight of the total dichlorocumene entering the catalyst zone. This indicates that a total yield of 84.6 of the theoretical may be obtained when the undehydrogenated dichlorocumene is recycled.

When in the above example the water steam or rate was increased so that 6 grams of superheated steam (temperature of about 500° C.) and 6.6 grams of dichlorocumene were passed through the catalyst bed each minute the contact time being thus reduced to about .9 seconds, a conversion per pass of 41 percent was obtained. However, liquid losses and total losses were somewhat increased so that the total yield obtainable was reduced to 79.3 percent of that theoretically possible.

When the weights of dichlorocumene and steam entering the catalyst bed each minute were respectively 11.2 and 8.99, vapor rates being 4.31 liters per minute and 36.25 liters per minute respectively, the contact time was .56 second and the conversion per pass was reduced to 31.2 percent. The losses were also reduced however to such an extent that the total yield obtainable by recycling was 86.7 of that theoretically possible.

Example 3

A mixture comprising toluene and methylchloride in the proportion of 1.5 molar of toluene for each 0.4 mol of methylchloride are passed with aluminum chloride through a refraction zone at about 106° C. The molar amount of aluminum used is the same as the molar amount of toluene and the time in the reaction vessel is about 0.1 hour.

Meta and ortho zylene are obtained in the ratio of about 50 to 1 along with some higher alkylated benzenes. The metazylene is separated by fractionation and is alkylated with propylene with the aid of aluminum chloride to 3,5-dimethylcumene by passing the metazylene, propylene and aluminum chloride simultaneously through a reaction zone in the proportions of about .5 mol of meta-zylene for each .3 mol of propylene and each .1 of aluminum chloride. The temperature of the reaction zone is maintained at about 50–100° C. The yield of 3,5-dimethylcumene is about 48 percent. 3,5-dimethylisopropenyl benzene is prepared by substituting the 3,5-dimethylcumene, thus prepared for the 3,4-dichlorocumene in the preceding example, other conditions remaining substantially the same.

Examples of suitable, relatively common dehydrogenation catalysts are alumina; the zinc oxide and aluminum oxide combinations with or without chromium oxide; and zinc chromite. Alumina modified zinc chromite catalysts and the like appear to have a slightly higher efficiency at the lower cracking temperatures.

Example 4

382 grams of Eastman Kodak's practical grade of 3,4-dichlorobenzoic acid was replaced with 300 grams of sulfonyl chloride ($SOCl_2$). The refluxing was continued for several hours and 376 grams of 3,4-dichlorobenzoyl chloride was obtained by distillation of the mixture. 375 grams of the benzoyl chloride thus obtained was refluxed with 70 grams of methyl alcohol for several hours. 350 grams of methyl-3,4-dichlorobenzoate was obtained. The methyl benzoate thus obtained was subjected to a Grignard's synthesis, utilizing the Grignard reagent obtained by treating 61 grams of magnesium turnings under dry ether with methyl chloride gas and thereafter hydrolyzing to form 3,4-dichlorophenyldimethylcarbinol, which dehydrates on distillation to produce 240 grams of 3,4 - dichloroisopropenylbenzene having the following characteristics:

| | |
|---|---|
| Refractive index for the D line at 25° C | 1.5740 |
| Density at 24° C. of | 1.215 |
| Molar refractivity | 50.92 |
| Boiling point at 760 mm. pressure ° C | 242 |
| Boiling point at 43 mm. pressure ° C | 141 |

The product produced is copolymerizable with butadiene to form rubbers having exceptionally desirable properties.

Example 5

3,5 - dichloroisopropenylbenzene was prepared from 3,5-dichlorotoluene obtained from ortho-toluidine by the method of Marvel, J. Am. Chem. Soc., 68, 864 (1946). Chlorine was bubbled into 129 g. of 3,5-dichlorotoluene at 180–190° C. in the presence of light until no further absorption occurred. An increase in weight of 83 g. resulted. To the product, weighing 212 g., was added dropwise 400 g. of 8 percent fuming sulfuric acid. After stirring for 30 hours the mixture was poured over cracked ice. The 3,5-dichlorobenzoic acid which precipitated was washed well with water and dried. It weighed 145 g., or 95 percent yield based on the dichlorotoluene. The acid was converted to 3,5-dichlorobenzoyl chloride in 95 percent yield by treating with 125 g. thionyl chloride. The chloride, weighing 151 g., was then allowed to react with 150 ml. of methyl alcohol and the resulting methyl 3,5-dichlorobenzoate, which distilled at 120–125° C. at 7 mm. weighed 133 g., or 90 percent of theory. The ester was treated with 2 equivalents of methyl magnesium chloride (125 g.), the Grignard complex hydrolyzed, and the product then dehydrated by refluxing with sodium bisulfate. The 3,5-dichloroisopropenylbenzene obtained weighed 88 g., or 72 percent of theory based on the ester used, and boiled at 109–111° C. at 12 mm. Its specific gravity is 1.196 and its refractive index is 1.5660, both measured at 25° C.

Example 6

2-chlorocymene was prepared by the method of Lubs and Young, Ind. Eng. Chem., 1130–33 (1919). One hundred grams of 2-chlorocymene dissolved in 750 ml. of acetic acid was oxidized at 110° C. with 750 ml. of concentrated nitric acid. After six hours the solution was cooled and the precipitated 3-chloro-4-methylbenzoic acid was filtered off, washed with water and dried. The product weighed 51 g., or 50 percent of theory.

The acid (51 g.) was converted to its ester by refluxing 20 hours with methyl alcohol (180 ml.) and concentrated sulfuric (10 g.). The yield of ester was 50 g. (90 percent of theory). The methyl 3-chloro-4-methylbenzoate (50 g.) was then allowed to react with 200 ml. of 4-M. methyl magnesium bromide in ether. The Grignard addition product was warmed for half an hour, and then hydrolyzed by pouring onto an ice-hydrochloric acid mixture. The ether was removed by distillation and the carbinol was dehydrated by refluxing with anhydrous potassium bisulafte. The 3-chloro-4-methylisopropenylbenzene was then recovered by distillation, B. P. 80° C. at 3 mm., $n_D^{25}$ 1.5508.

Example 7

To 350 g. of 3-methyl-4-chloroacetophenone, prepared by the method of Adams and Noller, Org. Syn., Coll. Vol. I, p. 109, was added 550 ml. of 4-molar methyl magnesium chloride in 750 ml. of ether. After two hours the mixture was poured over ice to which 250 ml. of concentrated hydrochloric acid had been added. The carbinol formed was dehydrated by heating with 2 g. of sodium bisulfate to yield 265 g., or 77 percent of theory, 3-methyl-4-chloroisopropenylbenzene, B. P. 107–108° C. at 17 mm., $n_D^{25}$ 1.5519, $d_{25}^{25}$ 1.055 g./ml.

Example 8

A suspension of 1350 g. (10.1 mols) of aluminum chloride in 2000 cc. of carbon disulfide was agitated vigorously in a 5-liter flask which was surrounded with an ice bath. To this mixture was then added in succession 535 g. (5.05 mols) of ortho-xylene was placed in the flask and 515 g. (5.05 mols) of acetic anhydride. The latter was added dropwise over a period of about 2 hours. The hydrogen chloride evolved was absorbed in water and the mixture was allowed to agitate overnight at room temperature. The following day 1500 cc. of carbon disulfide were distilled from the mixture, and the mixture was then poured over cracked ice containing concentrated hydrochloric acid. Ether was then added to the organic layer, which was separated, washed with water twice, then twice with 100 cc. of 10 percent sodium hydroxide, and again with water. The ether and carbon disulfide were stripped off, and the residue was fractionated at 50 mm. pressure to yield 509 g. of pure 3,4-dimethylacetophenone boiling at 156° C., freezing at −3°, and with a refractive index, $n_D^{25}$ of 1.5380. The yield is 68 percent.

Another ketone, believed to be 2,3-dimethyl acetophenone, is obtained boiling at 146° in amount sufficient to raise the yield to 88 percent. 732 cc. (2.9 mols) of 4 M. methyl magnesium bromide was placed in a 5-liter flask surrounded with an ice bath, and a solution of 433 g. (2.9 mols) of 3,4-dimethylacetophenone in 1000 cc. of ether was added dropwise with agitation. The addition required about 2 hours. The solution was then refluxed 1 hour, and hydrolyzed with the addition of about 600 g. of 25 percent ammonium chloride. The magnesium salts were filtered off and washed with ether. After stripping ether from the filtrate, the carbinol was dehydrated by heating to 180 to 200° for about one-half hour. The resulting product was fractionated at 8 mm. pressure to yield 310 g. of 3,4-dimethyl-alpha-methylstyrene boiling at 86°, freezing at −21°, and having a refractive index $n_D^{25}$ of 1.5376.

Although several embodiments of the invention have been herein shown and described, it will be understood that in accordance with the provisions of the patent statutes modifications may be made without departing from the spirit thereof and it is intended that the invention be limited only by the appended claims.

I claim:

1. An isopropenylbenzene having only two substituents both of which are attached directly to the nuclear carbon atoms and neither of which are attached to carbon atoms next adjacent that carrying the isopropenyl group; said substituents being further characterized in that they are both ortho-para directing groups which do not appreciably activate the benzene ring, said isopropenyl benzene being further characterized in that it is free from more than 20 percent of unpolymerizable impurities.

2. An isopropenylbenzene according to claim 1 in which at least one of said substituents is chlorine.

3. An isopropenylbenzene according to claim 1 which contains halogen in the 3-position.

4. An isopropenylbenzene according to claim 1 which contains chlorine directly attached to the carbon atom that is meta to the isopropenyl group.

5. 3-chloro-4-methylisopropenylbenzene which is free of substituents on the nuclear carbon atoms next adjacent that carrying the isopropenyl group and which contains less than 20 percent based on the weight of 3-chloro-4-methyl-isopropenylbenzene of isopropenylbenzenes having substituents ortho to the isopropenyl group.

6. An isopropenyl benzene of not in excess of eleven carbon atoms and consisting of carbon, hydrogen, and chlorine, all of said chlorine being attached to a nuclear carbon atom and having only two substituents both of which are attached directly to nuclear carbon atoms, and having both of the nuclear carbon atoms next adjacent that directly carrying the isopropenyl group connected to hydrogen, said isopropenyl benzene being further characterized in that it is free from more than 20 percent of unpolymerizable impurities.

7. 3-chloro-4-methyl-isopropenyl benzene, said isopropenyl benzene being further characterized in that it is free from more than 20 percent of unpolymerizable impurities.

8. 3,4-dichloro-isopropenyl benzene, said isopropenyl benzene being further characterized in that it is free from more than 20 percent of unpolymerizable impurities.

References Cited in the file of this patent

UNITED STATES PATENTS 2,486,379    Amos et al.             Nov. 1, 1949